United States Patent

[11] 3,612,752

[72] Inventor Thomas A. Banning, Jr.
5500-5520 South Shore Drive, Apt. 1408,
Chicago, Ill. 60637

[21] Appl. No. 559,494

[22] Filed June 22, 1966

[45] Patented Oct. 12, 1971

Continuation-in-part of application Ser. No. 459,399, May 27, 1965, now Patent No. 3,365,542, and a continuation-in-part of Ser. No. 490,402, Sept. 27, 1965, now Patent No. 3,478,162.

[54] SUBSCRIPTION TELEVISION SYSTEM WHICH RECEIVES EITHER FREE BROADCAST SIGNALS OR PAY WIRED SIGNALS

14 Claims, 23 Drawing Figs.

[52] U.S. Cl. .......... 178/5.1

[51] Int. Cl. .......... H04n 1/32, H04n 1/34

[50] Field of Search .......... 178/5.1, 6 PD; 179/15 ST; 325/31, 48, 64

[56] References Cited

UNITED STATES PATENTS

| | | | |
|---|---|---|---|
| 3,051,775 | 8/1962 | Novak et al. | 178/5.1 CS |
| 3,211,830 | 10/1965 | Sargent, Jr. | 178/5.1 CS X |
| 3,310,624 | 3/1967 | Banning, Jr. | 178/5.1 |
| 3,336,439 | 8/1967 | Banning, Jr. | 178/5.1 X |
| 3,355,546 | 11/1967 | King | 178/6 PD |
| 3,358,079 | 12/1967 | Banning, Jr. | 178/5.1 X |
| 3,365,542 | 1/1968 | Banning, Jr. | 178/5.1 X |

*Primary Examiner*—Rodney D. Bennett, Jr.
*Assistant Examiner*—Malcolm F. Hubler

ABSTRACT: This case discloses wired forms of transmission of the television RF signals, and the audio signals of the program, under control of a control station. with provision for receiving the program either over the air (broadcast) in inferior aesthetic quality, or by the wired transmission, in the superior aesthetic quality, the former, broadcast transmission being without pay or charge—the latter, wired transmission being for pay or charge. Various forms of the differentials of superior and inferior quality TV programs are disclosed.

Inventor:

Inventor:

Inventor:

Theo. M. [illegible]

Inventor:

SUBSCRIPTION TELEVISION SYSTEM WHICH RECEIVES EITHER FREE BROADCAST SIGNALS OR PAY WIRED SIGNALS

This case is a continuation-in-part of my earlier filed application Ser. No. 459,399, filed May 27, 1965, issued Jan. 23, 1968 as U.S. Pat. No. 3,365,542; and is also a continuation-in-part of my earlier filed application Ser. No. 490,402, filed Sept. 27, 1965 now Pat. No. 3,478,162.

This invention relates to improvements in pay or subscription television, radio, and the like. Specifically, the present improvements relate to that form of subscription or pay television or radio operation wherein the program of rendition is at the time, so emitted and/or received by persons provided with conventional receivers that such person may receive the program in an inferior aesthetic quality without pay or subscription charge therefor; but wherein subscribers (or persons making direct payment therefor), may receive the program in a superior aesthetic bursts rendition. Operations of this type are disclosed in various United States Letters patent issued to me and in numerous United States pending applications filed by me. By way of examples of pairs of renditions and receptions of the program, one rendition of each pair being of the inferior aesthetic quality, and the other rendition being of the superior aesthetic quality, I may mention the following:

Monochrome television translation (inferior) and Color television translation (superior); With "Commercials" (inferior) and without "Commercials" (superior); Negative translation of the television raster (inferior) and Positive translation of the raster (superior); Wrong Colors of a color raster translation (inferior) and Correct Colors of the color raster translation (superior); Audio component of the program excluded or interfered with (inferior) and clear Audio component of the program included (superior); Two-dimensional translation of the television raster (inferior) and Three-dimensional translation of the television raster, stereoscopic, (superior); and Monophone radio translation, or audio of the television program (inferior) and Stereophonic radio translation, or audio of the television program (superior). Various other pairs of aesthetic qualities of the translation are also disclosed by me in issued U.S. patents or pending applications, as may suggest themselves to others and are also contemplated as being within the scope of the inventive features to be hereinafter disclosed.

All of the translations of the pairs above referred to are of a form and kind to be completely intelligible to the viewer or listener of the program rendition, as the case may be; so that in the case of each such pair of renditions, the viewer of the television program, or the listener to the radio program, may receive a fully intelligible translation of the program, either without or with pay or subscription operation. Upon making the prepay operation, or informing the attendant at a suitable control station, the rendition may, in the case of each such pair, be produced in the superior aesthetic quality.

Provision is also made, in the structures to be hereinafter disclosed, for broadcasting the program as to which the subscribers or prepay receivers may make a choice of the desired rendition as already explained, such broadcasting of the program being, however, in the inferior aesthetic quality, and the superior aesthetic quality rendition not being available from the broadcast rendition. Thus, under my disclosed operations and structures, it may be possible for any member of the public, having available a conventional receiver (either television or audio, as the case may be) to receive the program without pay or subscription operation, but in the inferior, but fully intelligible, translation. A convenient arrangement making possible the foregoing operations, is one under which the program is emitted from the sending station through two carrier channels, one being a broadcast channel, and the other being a wired or nonaccessible carrier channel. Since the video component of a television program (and also the audio component, under conventional operations) is at radiofrequency of the carrier wave, such a wired operation should be by coaxial cable or line, especially when the subscribers to the operation are located at more than a short distance from the emitting station. To effect transmission of such RF component or components from the sending station (or from the control station serving a specified area or territory), provision must be made to enable each subscriber to the service, to receive either the inferior aesthetic quality translation or the superior aesthetic quality translation, at the choice of such subscriber. Accordingly, provision must be made for carrying the coaxial line or lines to each such subscriber, thus also avoiding accessibility by nonpay or nonsubscribers, to such superior aesthetic quality rendition; nevertheless by broadcasting the inferior aesthetic quality rendition, such nonpay or nonsubscribers may receive the program in a fully intelligible and satisfactory rendition. I have also made provision for reception of such rendition of the program by pay or subscription receivers, should it be desired to receive such broadcast rendition. The desirability of such an operation will appear hereinafter. I have herein disclosed structures constituted to effect all such optional operations.

It is highly desirable to make possible such "choice" of rendition to the pay or subscriber receives such that without need of changing or modifying the internal structures of conventional receivers in the hands of the public, thus enabling any person presently in possession of a conventional receiver, to become a subscriber and thus to avail himself of the privileges of the subscription or pay operation, by use of a very simple and inexpensive installation of the external switch unit, without need of gaining access to the circuitry of his conventional receiver, except for connection of such switch unit to the antenna RF input element of the receiver.

I have herein disclosed two embodiments of structure making possible the foregoing simple incorporation of such conventional receivers into the pay or subscription system. Under one such disclosed embodiment I may extend coaxial or other nonaccessible lines for both the inferior and the superior forms of translation or rendition, into an area where installation of one or more of the pay or subscription receivers is desired. I also extend two simple DC control lines to each of the pay or subscription receivers; and I locate the simple switching element required for such subscriber, close to his receiver (either television or radio) and connect the two control lines to the switch unit of such subscriber. Both of the coaxial lines available in the area, are connected into such switch. The conventional antenna for the receiver in question is also connected into such switch. Such switch is of form such that it normally establishes connection of the subscriber's antenna to his receiver, for conventional reception of broadcast signals and programs. By sending proper currents over the DC control lines the switch will respond to disconnect the RF input element of the receiver from the subscriber's antenna, and, depending on the current thus sent to such subscriber over his control lines, the switch will act to connect the RF input of the receiver to that coaxial line which carries either the inferior or the superior aesthetic quality rendition of the program, as desired by such subscriber. A convenient and simple form of such switch is a polar relay, constituted to normally have its movable tongue contact biased for engagement with the subscriber's antenna, such condition obtaining when no control current is supplied from the control station (or the sending station); by sending control current through the two control lines in one direction, the switch responds to establish connection of the RF input of the receiver, to the coaxial lines for the inferior aesthetic quality rendition; by reversing the current through the two control lines the switch reverses its tongue to establish connection of the RF input element of the receiver, to the coaxial lines carrying the superior aesthetic quality program's signals.

Such control lines are brought to suitable switching elements in the control station, to effect supply of the DC in either the one direction or the other direction, according to the program rendition desired by the subscriber.

It is now noted that with this embodiment, such a pair of the coaxial lines may be extended from the sending station into a neighborhood where several or many subscribers are located, with short lateral lines connecting from such pair of the coaxial lines to each subscriber, or to a group of subscribers. Various branching arrangements may be established, all connected to the pair of coaxial lines which enter such neighborhood, with a minimum overall length of the coaxial line required to serve many such subscribers, a pair of the simple control lines being extended from the control station, to each of receiving subscribers. Coaxial cables carrying various numbers of coaxial lines are conventionally available; such a cable including a number of pairs of the control lines corresponding to each such pair of the coaxial lines. Thus such embodiment, wherein the switch for each subscriber receiver is located close to such receiver, with a branch from the coaxial cable to each subscriber and with a pair of simple DC control lines extended from the control station to the switch of each such receiver, constitutes an arrangement requiring a minimum overall length of the coaxial cable to serve a large number of subscribers. It is however noted that such an arrangement as above outlined may be modified by running the coaxial cables for a given neighborhood directly from the sending station to such neighborhood, bypassing the control station, when the geography at the location of the installation is such that a more direct line from the sending station to such neighborhood may be traced, than a route which includes the control station.

Under the embodiment hereinafter disclosed which includes control lines from the control station to each of the receivers, it is necessary to provide such control lines from the control station to each such receiver. In a further modification of my present invention to be hereinafter described, I have provided a coin or token box or boxes at the location of each subscriber receiver, connected to the switch for such receiver, and constituted for control of such switch by coin or token deposit, without need of signals received from the control station over any control lines. Under this arrangement, it is only necessary to provide the coaxial lines for the superior, and if desired, for the inferior aesthetic quality translations, from the sending station to the neighborhood in question, with branch connections to the individual subscriber receivers. Accordingly, under this modified embodiment it is not necessary to provide the control stations, except for reasons and operations other than those disclosed herein. Under a modified arrangement, a single control line extending from the control station to the switch of the receiver, will be sufficient to enable full control of such switch from the control station.

Under an alternative embodiment to be hereinafter described, I locate the RF switch for each subscriber receiver at the control station, and provide a coaxial line from such switch to the corresponding subscriber receiver. Under this embodiment it is necessary to install a coaxial line from the control station to each such receiver individually, thus requiring a full length of such line for each subscriber receiver.

Other objects and uses of the invention will appear from a detailed description of the same, which consists in the features of construction and combinations of parts hereinafter described and claimed.

In the drawings:

FIGS. 1A, 2A, 3A, 4A, 5A, 6A and 7A respectively, show by block diagram, sending station units constituted to emit signals for programs according to pairs as follows: FIG. 1A, signals for monochrome picture translation and signals for color picture translation; FIG. 2A, signals with "Commercials" included and signals with Commercials excluded; FIG. 3A, signals for negative picture translation and signals for positive picture translation; FIG. 4A, signals for wrong color picture translation and signals for correct color picture translation; FIG. 5A, signals with audio component excluded and signals with audio component included; FIG. 6A, signals for two-dimensional picture translation and signals for three-dimensional picture translation (Stereoscopic); and FIG. 7A audio signals for monophonic radio translation and signals for stereophonic radio translation;

FIGS 1, 2, 3, 4, 5, 6 and 7, respectively, show, by block diagram, in fragmentary form, receiving systems operable according to the signal emissions of the corresponding FIGS. 1A, 2A, 3A, 4A, 5A, 6A, and 7A; such systems including the sending stations constituted to emit the signals according to the two aesthetic quality translations of the respective pairs, a single subscriber receiver being shown for each such pair operation;

FIG. 8 shows, on enlarged scale and schematically, a sending station in connection with a control station, by coaxial lines for delivering the signals for the two translation aesthetic qualities, to two subscriber receivers, such control station being provided with means to activate the control lines which lead to two subscriber receivers; and in this figure are included the coaxial lines for the two translation qualities, extending to the subscriber receivers, extended past but close to the control station by which the control lines are activated; and in this figure I have shown, by block diagram, a simple form of the RF switch capable of producing selection of either the inferior or the superior aesthetic quality translation by proper activation of the control lines leading to such subscriber receiver, or by insertion of a coin or token into the proper time delay circuit control coin or token unit; a like switch and coin or token unit or units being provided in connection with each of the subscriber receivers;

FIG. 9 shows, on enlarged scale as compared to FIG. 8, and in section, a convenient form of plug for insertion into a socket plate to either an inferior quality signal position or a superior quality signal position, as desired, for corresponding activation of the control lines to the subscriber receiver;

FIG. 10 shows, by block diagram, a sending station constituted to emit video signals for translation to produce a picture and video program, with provision for emission of such video signals to produce the raster in either color or monochrome translation, with provision for transmission of the video signals for both forms of translation, to a control station by nonaccessible transmission (such as coaxial cable), and with provision of broadcasting the inferior quality video signals; together with switching means constituted to enable delivery of the two quality translation forms of signals to the nonaccessible transmission lines, and to the broadcasting antenna, as desired;

FIG. 11 shows, by block diagram, a simple form of control station wherein receiver, is incorporated an RF control switch for each of the subscriber receivers, with nonaccessible transmission of the selected RF signals from the control station to the switch corresponding to each receiver; such control station also including attendant-operated switching means to cause such RF switch to move to position proper for translation of the program under the selected aesthetic quality requested by the operator of the receiver;

Figures 8, 9, 16:
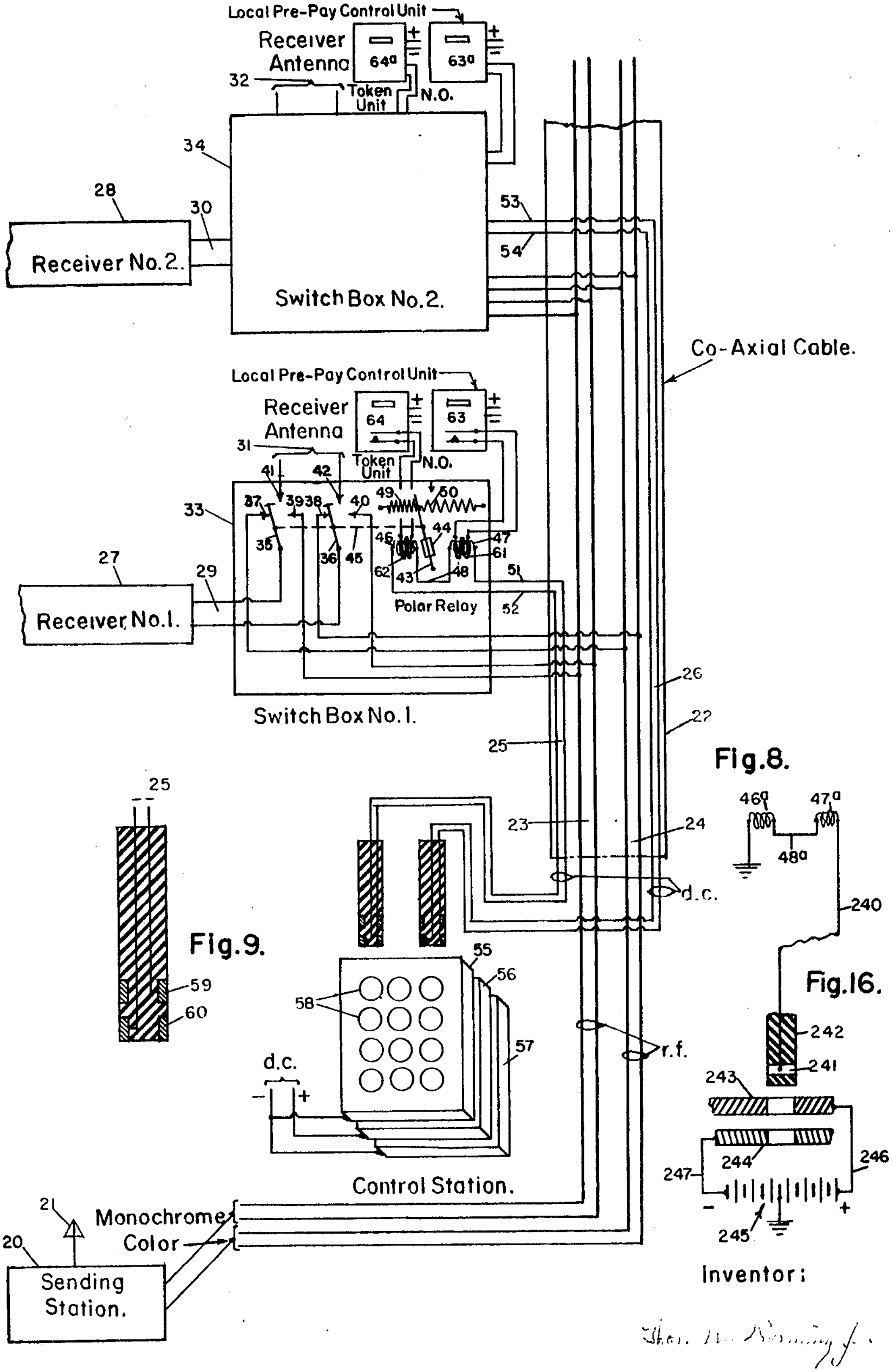
Figures 10, 11, 12, 13, 14, 15:
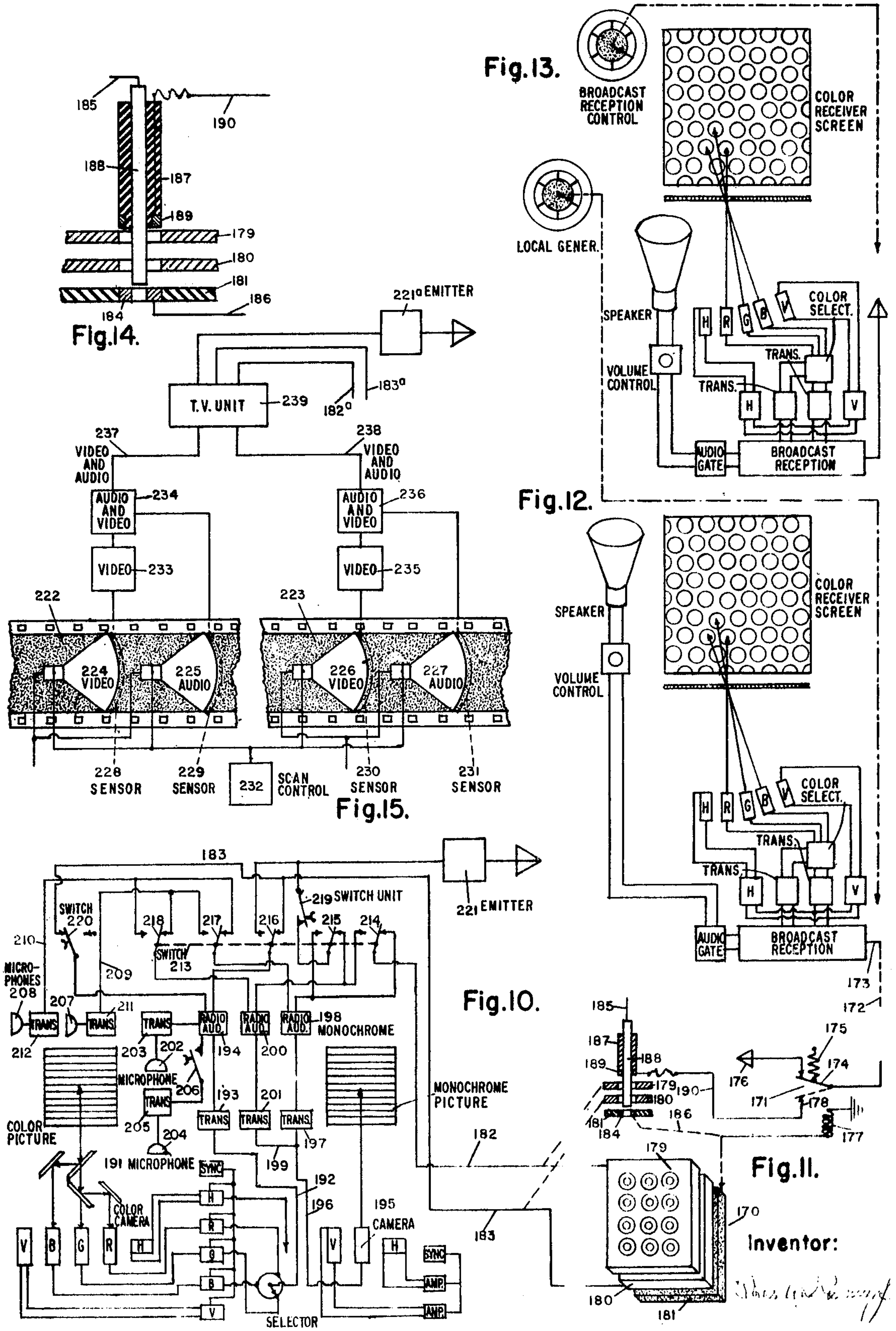
FIG. 12 shows, big block diagram, a conventional form of color translation subscriber receiver, usable in connection with the control station shown in FIG. 11.
FIG. 13 shows, by block diagram, a conventional receiver which may receive program signals emitted by broadcasting from the station shown in FIG. 10.

FIG. 14 shows, on enlarged scale, a simple form of plug-in switching element constituted to enable the control station attendant to readily produce either of two switching operations (for production of either the inferior aesthetic quality translation or the superior aesthetic quality translation by the corresponding subscriber receiver), or to enable such subscriber receiver to receive whatever broadcast program may be available at the time;

FIG. 15 shows, by block diagram, a simple embodiment of translation from tape recordings, of two recordings of the program, the one being for the inferior quality translation, and the other being for the superior quality translation, such showing of FIG. 15 being usable with the switching apparatus shown in FIG. 10, or other switching apparatus, as desired; and FIG. 16 shows, by block diagram, an alternate arrangement of switching unit control circuitry; wherein the reversal of direction of the control DC current is produced by use of a single control line extending from the control station to a subscriber-receiver.

Figure 5:
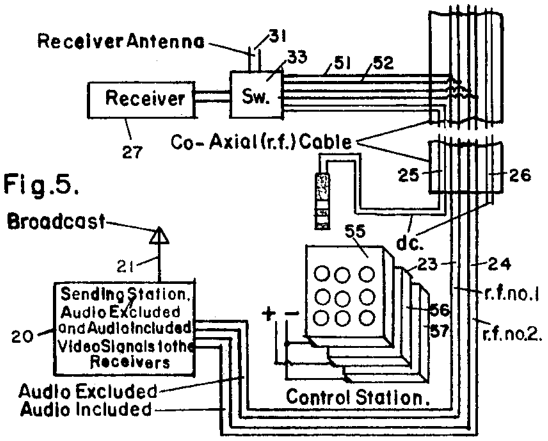
Figure 2:
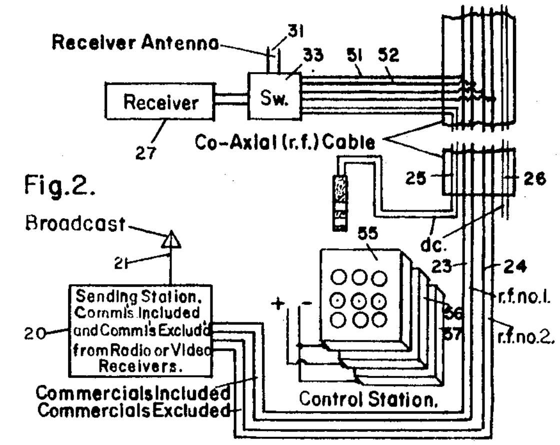
Figure 4:
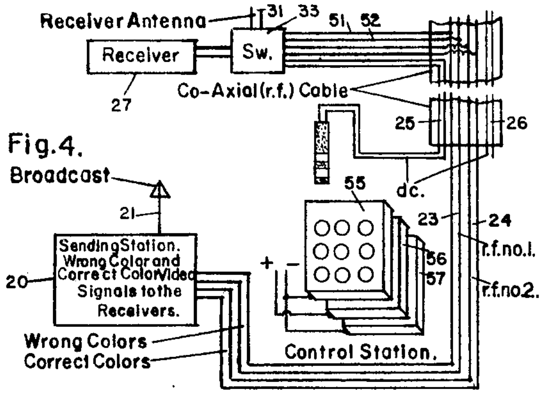
Figure 6:
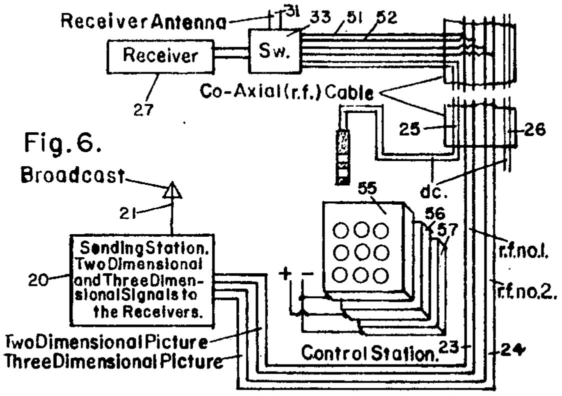
Figure 3:
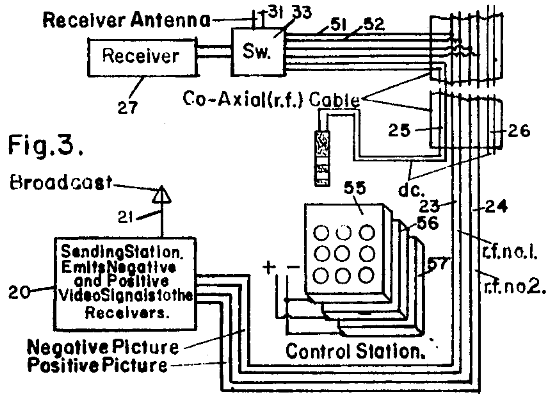
Figure 7:
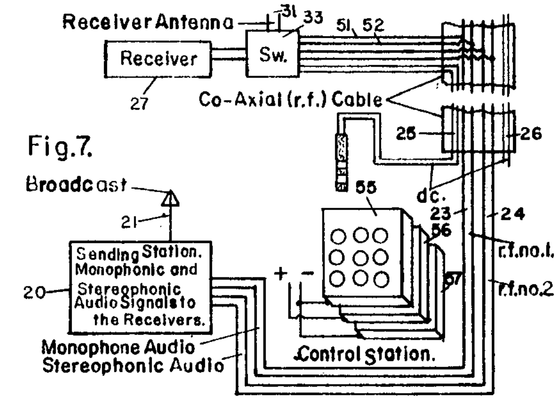
Figure 1:
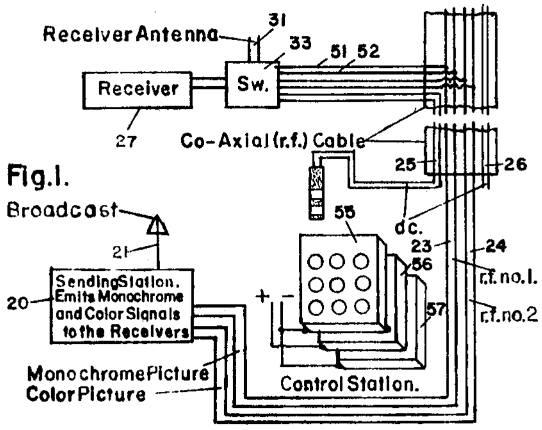

Referring first to FIG. 1, I have therein shown by block diagram, a sending station 20, constituted to emit the program simultaneously under two sets of translatable signals, corresponding to the inferior translation operation, and to the superior translation operation. One set of such signals (e.g., the inferior translatable set) is broadcast by the antenna 21, so that any receiver within reception range of such sending station, and properly equipped, may receive such broadcast rendition freely, being without pay or subscription operation. Suitable switching equipment and accessories to enable production of such operation are included in the sending station 20, and an example thereof is shown in FIG. 10 hereof, as well as in various other figures.

A nonaccessible line or lines is also provided for transmitting the program to such subscription receivers as may lie within the area or neighborhood to be served by such nonaccessible lines. Each such nonaccessible line includes a pair of conductors (RF), for transmitting signals translatable to produce the inferior aesthetic quality reception, and another pair of conductors (RF) for transmitting signals translatable to produce the superior aesthetic quality reception. Accordingly, both the inferior-quality signals and the superior-quality signals are transmitted to the area or neighborhood by carrier means which is not accessible to persons other than subscribers to the pay or subscription operations. Such line is indicated at 22 (see FIG. 8) in the form of a cable wherein there are included the two coaxial pairs 23 and 24. In such showing of FIG. 8 there are also included in such cable the pairs of DC conductors 25 and 26 which will be discussed in detail hereinafter. It will be understood that such a cable may include several or many pairs of the coaxial conductors, such RF conductors being paired to produce antenna conductors (two lines for each antenna). Conventionally such two lines of each antenna pair are shielded together, and they produce such shielded transmission means for connection to the two antenna input connections to a conventional receiver (either television or radio). Thus the cable includes at least two such shielded pairs, one for transmission of the inferior aesthetic quality signals, and the other for transmission of the superior aesthetic quality signals. Such two pairs are brought to a position close to or at the location, of the receiver to be served.

It is also contemplated that branch cables may be extended from a main cable of the foregoing qualifications, such branch cable itself serving some or many receivers in a portion of the larger area served by the main cable. Since such coaxial lines carry potential but practically no current, it is evident that a large number of receivers may be thus served primarily from a main cable.

In FIG. 8, I have shown by block diagram, two receivers 27 and 28. The antenna input connections for these receivers are shown at 29 and 30. These antenna input connections are normally served by antennas through the connections 31 and 32 for the two receivers, respectively. The antennas normally provided for the receivers may be built into the receiver or exposed; but in either case provision may be readily made for disconnecting or opening the normal or conventional antenna from each receiver, to enable insertion of a switch-unit 33 or 34 between such receiver antenna and the RF input element of the receiver. Such switch-unit may be located at position convenient to the premises, and is of small size and simple structure and operation, as follows:

Each switch includes the two-pole, double-throw switch element, which includes the movable tongues 35 and 36, each such tongue being shiftable from its central or normally biased position in leftward direction to engage the contact 37 or 38, as the case may be, or rightward direction to engage the contact 39 or 40, as the case may be. When in their central or normally biased position such tongues engage the central contacts 41 and 42, respectively. The two tongues are connected to the input elements 29 (or 30) of the receiver. The contacts 41 and 42 of the switch-unit are connected to the antenna lines 31 or 32, of the receivers. Accordingly, when the switch-unit stands in its normally biased position the receiver receives the broadcast RF signals in conventional manner.

At one side of such two-pole, double-throw switch there is provided the polar relay unit including the tongue 43 carrying the permanent magnet element 44. Such tongue connects to the tongues 35 and 36 by the link 45 so that rock of such biased and permanent magnet tongue in either direction will accordingly shift the two tongues 35 and 36. Mounted at opposite sides of such tongue 43 are the two windings 46 and 47 which are connected in series connection by the jumper 48, such windings being connected together to produce fluxes acting together, to throw the tongue either to the left or to the right, depending on the direction of current flow through such windings. The two springs 49 and 50 are both connected in opposition to the tongue 43, such springs being balanced to restore the tongue to its central position when the current through such windings is terminated. Accordingly, when no control signal is received by the switch-unit, connection of the RF input of the receiver to the receiver antenna is restored and continues until a control signal in either direction is supplied to the switch-unit.

The terminals 51 and 52 for the switch-unit 33 are connected to the control lines 25 already referred to; and the terminals 53 and 54 for the switch-unit 34 are connected to the control lines 26. Thus each receiver's switch-unit is served by control lines individual to such receiver, such control lines extending from the control station or other control location. It is also evident that when provision is made for supplying DC to the control lines for a specified receiver, the response of the switch tongues 35 and 36 of the switch-unit for such receiver will be in the one direction or the other, depending on the direction of supply of the control current to such control lines. The left-hand contacts 37 and 38 (left-hand) connect to the RF lines 24, and the contacts 39 and 40 connect to the RF lines 23. Accordingly, with the tongues shifted leftwardly to the position shown in FIG. 8, the receiver will receive the color signals carried by the coaxial lines 34. Had the control current been in reversed direction, the switch tongues would have been shifted rightwardly, to connect the RF input to the receiver, to the coaxial lines 23.

The control of DC supply to the control lines for each receiver, is conveniently effected at a control station, legended on FIG. 8. Such control station includes the three-deck socket element including the decks 55, 56 and 57. Each deck is provided with socket holes 58 corresponding to the several receivers which are under control of the control station in question. The holes in the three decks are in vertical alignment with each other so that plugs inserted through the holes of the top deck may also enter corresponding holes of the lower deck 56, and, if desired, holes of the lowest deck 57. The two decks 55 and 57 (top and bottom) are connected together, and supplied with DC of one polarity (e.g., negative), and the intermediate deck 56 is supplied with DC of the opposite polarity (e.g., positive). Each pair of the control lines terminates in a plug of the form shown in enlarged section in FIG. 9. Such plug is of insulating material, and provided with the two contact rings 59 and 60, spaced apart a distance equal to the separation of two of the decks from each other (or slightly more than such distance to avoid short circuiting between the central deck and either the top or the bottom deck during insertion or removal of the plug into or from the deck. By inserting the plug into a hole 58 of the top deck, far enough to bring the lower contact ring into engagement with the middle deck 56, the upper contact ring 59 will be in engagement with the top deck 55. Accordingly, positive current will be delivered to the lower ring 60 and thence to the right-hand control line (FIG. 9), negative returning current from the left-hand control line will flow to the upper ring 59, and thence to the top deck 55, negative. This will cause the switch-unit of the corresponding receiver to receive RF program signals of the aesthetic quality corresponding to such switch-unit position. By inserting the plug further through the decks, to bring the lower contact ring 60 into engagement with the lower deck 57, the upper contact ring 59 will be brought into engagement with the middle deck 56. Thus the direction of current supplied through the control circuit of the corresponding receiver, will be reversed, with corresponding reversal of the switch-unit of such receiver. This will cause such switch-unit to deliver RF program signals of the other aesthetic quality, to the receiver.

It is now noted that the selection of aesthetic quality may be effected by shift of the switch-unit contacts by means other than the control currents supplied form the control station. I have provided means local to the receiver for effecting such selection of the aesthetic quality of the translation of the program. One such supplemental means is shown in FIG. 8, as follows:

I have provided supplemental windings 61 and 62 at the two sides of the relay, either one of which supplemental windings, when electrified will actuate the tongue 43 in the direction corresponding to such electrification. These are the windings shown over the windings 46 and 47 in FIG. 8. The winding 61 (over 47) may be electrified by insertion of a proper coin or coins into the time control prepay unit 63 (normally open but closed by the coin insertion), to cause the tongue to shift to its position for delivery of the superior aesthetic quality signals to the receiver as long as connection by the prepay unit; the winding 62 (over 46) may be electrified by insertion of a proper token or tokens into the token unit 64 (normally open but closed by the token insertion), to cause the tongue to shift to its position for delivery of the inferior quality signals to the receiver. This latter operation (shifting to the inferior-quality signals) might be desirable when such inferior aesthetic quality of translation was actually more acceptable than the conventional signal program then being broadcast. An example of such relative desirability might be the case when the broadcast signals included the "Commercials," but wherein each of the program renditions of the "inferior" and the "superior" aesthetic qualities excluded such commercials; such an operation being hereinafter referred to.

In connection with the foregoing supplemental operations which are available by use of such units 63 or 64, the following further operations may be produced:

In case the user of a subscriber receiver had requested the attendant at the control station to effect operations to cause the switch-unit of such receiver to deliver the program under the inferior aesthetic quality signals, the switch-unit would be thrown to its inferior aesthetic quality signals delivering position. Having received such inferior aesthetic quality reception the user of such receiver might decide to receive the superior aesthetic quality translation of such program. This could be effected by further plug-in operation produced by the attendant at the control station. Alternatively such superior aesthetic quality signals reception may be effected directly by the user of the receiver, under the following conditions:

The original shifting of the tongue of the polar relay to its inferior aesthetic quality signals position was effected and continued by electrification of the windings 46 and 47 in the direction needed for such operation. Such electrification in that direction will continue as long as the attendant retains the plug at proper insertion into the socket element. The insertion of the proper coin or coins into the unit 63 will effect electrification of the winding 61 in direction to produce an m.m.f. against the m.m.f. produced by the foregoing operation of the attendant. By designing such winding 61 that the electrification thereof by the coinbox operation (63), shall produce an m.m.f. of strength sufficient to overpower the m.m.f. produced by the attendant's operation, it is possible for the insertion of the coin or coins to produce such overpowering m.m.f. effect. This will shift the tongue 43 to its position for delivery of the superior aesthetic quality translation of the program. It is noted that such operation is produced by a coin operation, thus effecting prepay for such superior quality reception.

Both of the units 63 (prepay) and 64 (token) should be of design proper to ensure continuation of their intended operations for a length of time corresponding to the program then being translated.

Various coin or token operated time delay prepay units are well known in the arts, which when operated by coin or token insertion activate switch contacts to open or close a circuit with continuance of such opened or closed condition for a predetermined time interval. I do not intend to limit myself to any specific embodiment of such unit, and the showing of the units herein identified as 63 and 64, and 63$^a$ and 64$_a$ by block diagrams fall within this explanation.

The pairs of RF signal carriers 23 and 24 extend directly from the sending station 20 to the area which is to be served by programs carried by such carriers. It is thus unnecessary for such carriers to come to the control station, and a layout to serve a given area's receivers may bypass such control station, depending on the geography of the served area, and the location of the sending station with respect thereto. Since the control lines carry small DC current only sufficient to actuate the switch-units, there may be conditions under which the control currents may for example be transmitted, over presently installed telephone lines for all or a portion of the distances between the control station and the subscriber receivers. Suitable ancillary equipment may be included to properly introduce the control signals into such existing lines, and to properly separate the control signal currents from the lines at the terminal locations of delivery of the control signals.

Various pairs of differing aesthetic quality signals are suitable for the operations already described including different aesthetic quality translations of a program. I have already referred to seven such pairs, one of which comprises a radio program, or the audio component of a television program. It is also possible to incorporate a third specification as a component of the inferior translation, excluding the same from the superior translation. An example of such a third component might be "Commercials," incorporated into the inferior translation but excluded from the superior translation. Thus it appears that some of the seven pairs previously referred to, include as an inferior translation component, a component of the inferior translation of some other one of the pairs, additional to the inferior translation component defined in one of such seven illustrative pairs. Thereby a dual benefit may accrue to the user of the (pay or subscription) receiver, when choosing the superior translation operation. Accordingly, it will be understood that the above defined structural arrangement which embodies the inclusion of the commercials as a component of the inferior translation, but excludes such commercials from the superior translation, is defined by way of example, only. Other benefits from other such dual exclusions from the superior translation, will suggest themselves to the student of this specification.

Reference is next made to FIGS. 1, 2, 3, 4, 5, 6 and 7, and to the companion FIGS. 1A, 2A, 3A, 4A, 5A, 6A, and 7A. Each of such FIGS. 1 to 7, inclusive, shows by block diagram a simple embodiment of the structural arrangements shown in FIGS. 8 and 9, for each of the seven pairs of inferior and superior aesthetic quality translations. Such showings are limited to the transmission elements and the controls, from sending stations constituted to emit two sets of signals, for the inferior and the superior aesthetic quality translations, respectively.

The monochrome camera 71 is also provided, viewing the same object as is viewed by the color camera. Such object is numbered 72, and is shown twice in the figure, once for the color camera, and once for the monochrome camera, for simplicity of illustration, there being but the one object illustrated. Such monochrome camera delivers its monochrome signals to the unit 73, the audio for such monochrome signals arriving from the second microphone 74, through the unit 75. From the unit 73 the stream of signals, including the monochrome video and the corresponding audio, is delivered over the lines 69 and 70 to the coaxial pair 23 of FIG. 8. Thus I have made provision for delivering both monochrome and color signals, and corresponding audio signals, to the two pairs of coaxial lines of the showing of FIG. 8, and that of FIG. 1.

The television emitter unit for broadcasting, 78, receives either the monochrome signals and audio, or the color signals and audio, by selection of the switch 79. The monochrome signals delivered to such switch are received from the unit 80 connected to the output from the monochrome camera at a point below the unit 73; and a third microphone 81 connects to such unit 80 through the unit 82. With this structure the following operations are possible.

Figure 1A:
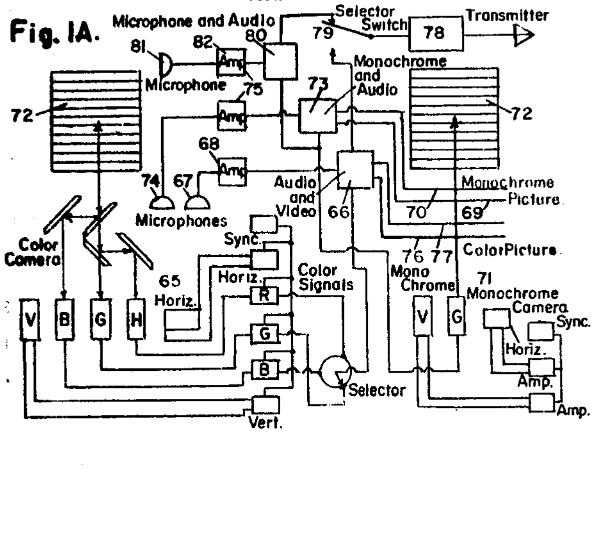

When a conventional program is being emitted in monochrome, such monochrome program will be delivered to the antenna (the switch 79 being in the position shown in FIG. 1A.) Such monochrome signals are also delivered directly to the coaxial monochrome lines 69 and 70 for possible delivery to the subscriber receiver. Under this operation the color signals are also delivered to the coaxial lines 76 and 77, for possible delivery to the subscriber's receiver. Audio for such monochrome thus delivered to the subscriber's receiver originates at the microphone 74, and audio for the color thus delivered to the subscriber's receiver originates at the microphone 67. Audio for the monochrome delivered to the antenna for broadcasting, originates at the microphone 81. Accordingly, under this arrangement both monochrome and color signals of the conventional program may be sent to the subscriber's receiver with audio originating at a microphone other than that which delivers the audio to the broadcasting lines. Thus, the commercials may be included in the broadcast program, but excluded from the program delivered to the receiver of the subscriber, whether delivered to such subscriber's receiver in monochrome or color.

By shifting the switch 79 to its lowered position (in FIG. 1A), the color signals may be broadcast, thus making it possible to broadcast conventional programs in color. When so doing the audio signals will originate at the microphone 67, may include or not include commercials, according to the audio component of the program thus broadcast.

In FIG. 10, I have shown an alternative form of sending station, which provides for alternative operations, as will presently appear hereinafter.

Figure 2A:
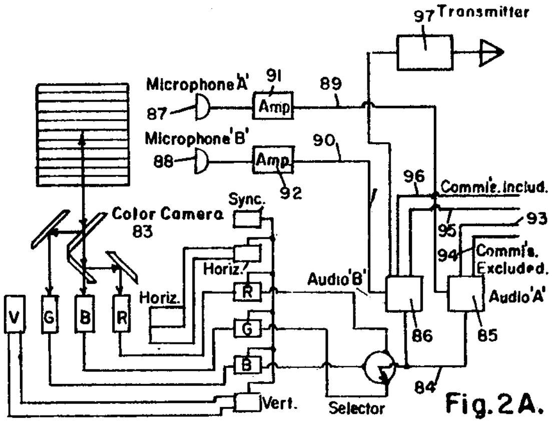

Referring next to FIG. 2A, I have therein shown by block diagram, a sending station including the color signals producing camera 83 of form similar to that shown in previously described FIG. 1A. This structure therefore delivers the color signals to the line 84. From such line 84 such signals are delivered to the units 85 and 86. The microphones 87 and 88 deliver audio signals to such units 85 and 86 by the lines 89 and 90 which include the units 91 and 92, respectively. The units 85 and 86 incorporate the audio signals from such microphones into the streams of signals delivered by such units 85 and 86, respectively, Such unit 85 delivers such combined video and audio signals, including the audio from the microphone 87, to the coaxial lines 93 and 94 which connect to the lines which deliver the superior aesthetic quality signals to the area being served. Also, such unit 86 delivers such combined video and audio signals, including the audio from the microphone 88, to the coaxial lines 95 and 96 which connect to the lines which deliver the inferior aesthetic quality signals to the area being served. Accordingly, when the microphone 87 is used for instituting audio component without commercials, such noncommercial signals will be delivered over the superior aesthetic quality coaxial lines to the several subscriber receivers; and when the microphone 88 is used for instituting audio component including commercials, such commercial signals aesthetic be delivered over the inferior aesthetic quality coaxial, lines to the several subscriber receivers.

The television emitter unit 97 receives the color signals which include the audio from the microphone 88, and broadcasts such audio inclusive signals. When such microphone 88 is used for instituting audio component including commercials, such commercials will be broadcast and received and translated by conventional receivers.

Figure 3A:
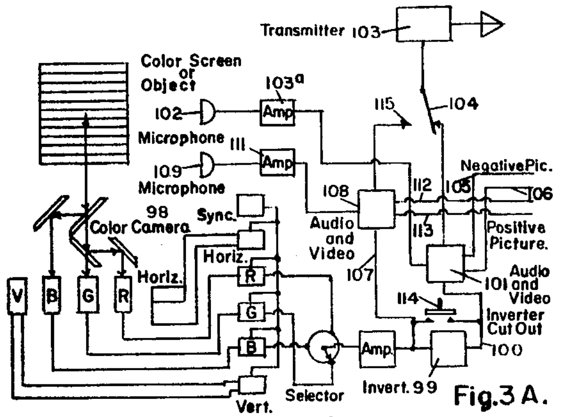

Referring next to FIG. 3A, I have therein shown by block diagram, the color signals producing camera 98. In this embodiment it is desired to make provision for emission of the video signals under the condition that such signals are inverted as compared to conventional operations. When such inverted video signals are received and translated in a conventional color or monochrome receiver, a negative picture translation will be produced (that is, areas which are actually dark will be translated as light, and vice versa, areas which are actually light will be translated as dark, in the raster produced on the television screen). Accordingly, provision is made for broadcasting the pay or subscription program video signals inverted, thus causing conventional broadcast reception receivers to translate the video component of the program, in negative form. If the audio component is included with such inverted broadcast video signal component, a conventional receiver may receive and translate the picture component in inverted form, but accompanied by the audio.

In the embodiment shown in FIG. 3A, I have included the supplemental amplifier unit 99 in the line 100 which delivers the video component for broadcasting and for the inferior aesthetic quality subscriber receiver. Such line delivers to the unit 101 into which the audio component from the microphone 102 delivers the audio for such translations, through the unit 103[a]. Such unit 101 delivers such inverted video component, together with the audio from such microphone 102, to the television transmitter unit 103 through the selection of the switch 104; and transmission of such inverted video component, together with such audio component from the microphone 102 is also delivered to the lines 105 and 106 which lead to the coaxial lines for negative video translation, to the subscriber receiver, (see FIG. 3). A branch line 107 from the video component line which delivers the video color signals to the unit 99, delivers the noninverted color signals arriving from the color camera, to the unit 108. Audio signals from a microphone 109 are delivered to the unit 108, coming through the unit 111, for incorporation into the stream of noninverted color signals. From such unit 108 such noninverted color signals are delivered, together with the incorporated audio signals from the microphone 109, to the coaxial lines 112 and 113 which lead to the coaxial line legended "Positive Picture" in FIG. 3.

The inverter unit 99 is bridged by the switch 114. When such switch is open as shown in FIG. 3A, the color video signals from the camera become inverted by the unit 99, and are delivered in such inverted condition to the line 100. This will cause delivery of the negative video signals to the unit 101, and thence to the coaxial line carrying the inferior aesthetic quality signals, and to the broadcasting unit 103; but since the line 107 connects to the video signal line delivering such signals from the color camera, at a location in advance of the inverter unit 99, the video signals delivered to the coaxial line for superior aesthetic quality translation, will remain in their noninverted condition, for production of the color raster. Such unit 108, thus receiving positive video signals, will also deliver such positive signals to the switch contact 115 of the switch 104. Accordingly, by shifting such switch leftwardly to such contact 115 it becomes possible to broadcast the color signals in positive form. Such an operation might be desirable when a special program was not being emitted by the color camera, and when the subscriber receiver switch unit was not being activated, its tongue then standing in its central position, connecting the receiver with its own antenna.

Study of the disclosures of structure shown in FIG. 3A will show that when such broadcasting operation is being produced as a color signals broadcast, for positive picture translation, the microphone 102 serves as a medium to introduce the audio into the stream of broadcast signals, whereas the microphone 109 serves as a medium to introduce the audio signals into the stream of positive signals being delivered to the coaxial line for superior aesthetic translation. Under this arrangement it is possible to use the microphone 102 for commercial announcements which do not enter the stream of signals being transmitted to the coaxial line for superior aesthetic translation, while at the same time delivering such commercial announcements into the broadcast stream of signals. During such operation the microphone 109 is used to deliver into the stream of positive video signals going to the coaxial line for superior (positive) translation, audio announcements relevant to the program being thus delivered to the subscriber receiver in the superior translation form.

By closing the switch 114 to bridge the unit 99, the video signals delivered to the unit 101 will be noninverted (for positive translation). Under this operational condition the video signals broadcast will be for positive color translation, a conventional program being then broadcast.

Figure 4A:
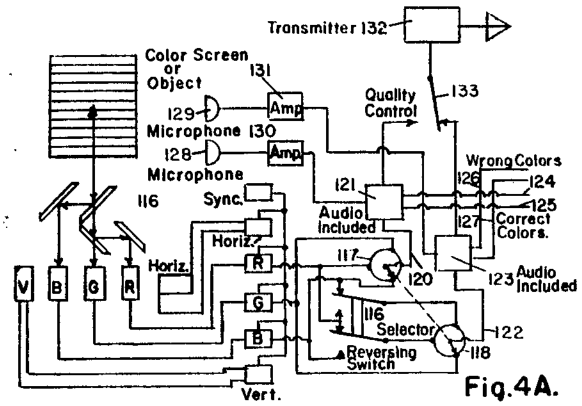

Referring next to FIG. 4A, I have therein shown, by block diagram, a sending station provided with structures by which the video signals may be emitted either in wrong color sequence or correct color sequence, so that translation of the former sequence signals in a conventional receiver will produce a raster in the wrong colors, whereas translation of the latter sequence signals in a conventional receiver will produce the raster in the correct colors. Conveniently the wrong color sequence is produced by interchange of the red and the blue-violet color components, leaving the green unchanged. The schematic showing of FIG. 4A includes the two color component signal selectors 117 and 118 synchronized to cause the color components to be incorporated into the stream of video signals either in correct color sequence or wrong color sequence. In case of use of the selector 118, the wrong color signals are delivered. In case of use of the selector 117 the correct color sequence will be produced. For example, when the correct color sequence is Red, Green, Blue, Red, etc., that sequence is always produced in the signals delivered by the selector 117; but in the case of the signals delivered by the selector 118, either the correct sequence R, G, B, R, etc., is produced, or the wrong sequence B, G, R, B, etc. is produced. The reversal of the red and blue components is produced by the switching unit 119. The output connection 120 from the unit 117 is carried to the unit 121, and the output connection 122 from the unit 118 is carried to the unit 123. The unit 121 delivers correct sequence signals to the lines 124 and 125 which connect the coaxial lines for the superior aesthetic quality translation (see FIG. 4); and the unit 123 delivers wrong sequence signals to the lines 126 and 127 which connect to the coaxial lines for the inferior aesthetic quality translation. The microphones 128 and 129 connect to the units 121 and 123, respectively, through the units 130 and 131, respectively. The unit 123 connects to the television unit 132 under selection of the switch 133. With the foregoing structure the following operations are possible:

With the switch unit 119 and the switch unit 133 in the positions shown, correct color signals will be delivered to the coaxial lines for superior aesthetic quality translation, wrong color signals will be delivered to the inferior aesthetic quality translation coaxial lines, and the wrong color signals will be broadcast. By reversing the switch unit 119, correct color signals will be delivered to both the inferior aesthetic quality interpretation coaxial lines, and to the broadcast antenna. Such a condition might be desirable when a conventional program was being emitted, requiring no discrimination as between inferior and superior aesthetic quality translations; but under the conditions produced by such reversal of such switch 119, the correct color signals would be broadcast, so that the subscriber could receive on his receiver, and correctly translate, such color signals, without use of either set of the coaxial lines, the tongue 43 of the polar relay of the switch-unit controlling such subscriber receiver's receiver, standing in its normal or central position, as already explained.

It is further noted that the structure above described (FIG. 4A), is one wherein the superior aesthetic quality translation may be produced without inclusion of the commercials, by using the microphone 128, whereas simultaneously, use of the microphone 129 may include the commercials introduced into the inferior aesthetic quality translation.

Figure 5A:
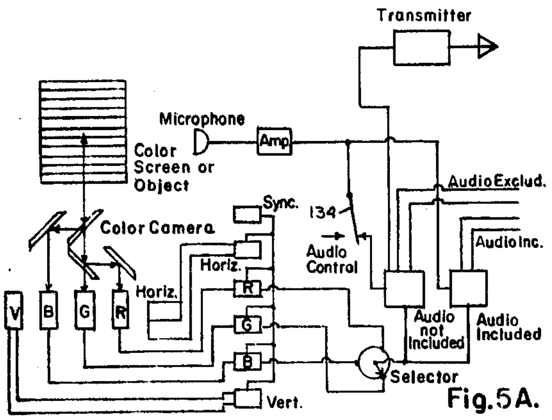

Reference is next made to FIG. 5A, wherein provision is made for excluding audio component from the inferior aesthetic quality translation and from the broadcast translation, by use of the switch 134, when thrown leftwardly from its position shown in the figure, and for inclusion of such audio component in the superior aesthetic quality translation with the switch unshifted. With such switch in the position shown in FIG. 5A, such audio component will be included in both the inferior and the superior aesthetic quality translations, as well as included in the broadcast rendition, such audio inclusion being desirable when a conventional program is being emitted.

Figure 6A:
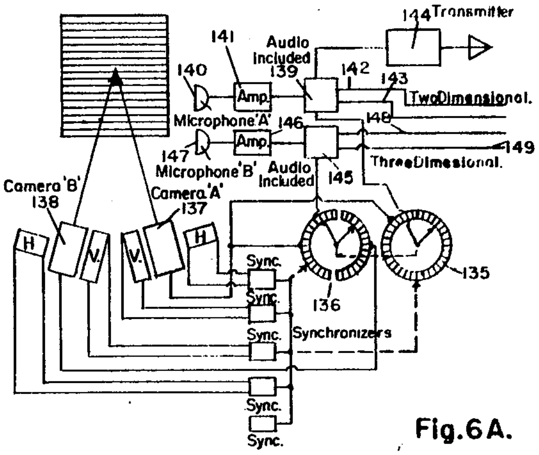

Referring next to FIG. 6A, I have therein shown by block diagram, a sending station arrangement constituted to deliver video signals for translation on a conventional television receiver as either a two-dimensional translation (conventional) or as a three-dimensional translation (stereoscopic). In the showing of this figure, I have provided the synchronized units 135 and 136 under synchronized control of the bursts conventionally produced in connection with the horizontal and the vertical deflection units of the receiver. Such unit 135 controls delivery of video signals from a single camera 137 for all of the fields produced for the conventional frame of translation, so that all such fields translate video signals arriving from viewing the object at a single vantage point; whereas the unit 136 controls delivery of video signals for the two fields comprising each frame of the picture, in alternation, first from one camera, then from the other camera 138, back to the first camera, etc., thus producing one field from each camera, during the production of each frame. The video signals from such unit 135 are delivered to the unit 139, the microphone 140 delivering audio to such unit 139 through the unit 141, and such unit 139 delivering such two-dimensional video signals to the lines 142 and 143 connected to the coaxial lines for the inferior aesthetic quality translation, and to the television unit 144 for broadcasting; whereas the unit 136 delivers three-dimensional signals to the unit 145, to which unit 145 audio signals are delivered through the unit 146, from the microphone 147. The three-dimensional video signals and audio signals from the unit 145 are delivered to the lines 148 and 149, leading to the coaxial line for the superior aesthetic quality translation.

The provision of the two microphones for delivery to the two units 139 and 145, enables inclusion of the commercials in the broadcast rendition and in the inferior aesthetic quality translation, if desired, but exclusion of such commercials from the superior aesthetic quality rendition.

Figure 7A:
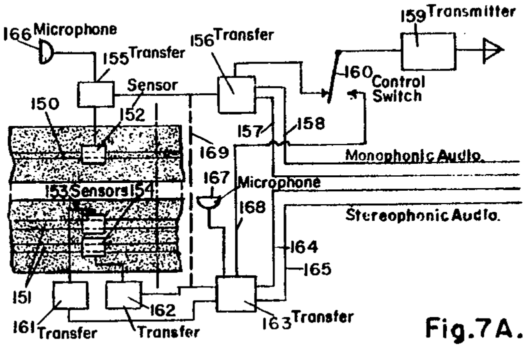

Reference is next made to FIG. 7A, wherein I have disclosed by block diagram, a sending station constituted to deliver audio signals for a program, simultaneously to receivers, either under monophonic rendition or under stereophonic rendition; the former being an inferior aesthetic quality rendition, and the latter being a superior aesthetic quality rendition, of such audio program. The showing of FIG. 7A is as follows:

The single-track tape recording 150 is the monophonic recording, and the dual-track recording 151 is the stereophonic recording. The single sensing unit 152 senses the monophonic recording, and the two sensing units 153 and 154 sense the two sideband recordings of the stereophonic recording. The monophonic signals are delivered to the unit 155 and thence to the unit 156. From such unit 156 such monophonic signals are delivered to the lines 157 and 158 leading to the coaxial line for the inferior aesthetic translation; and from the unit 156 such signals may be delivered to the broadcasting unit 159 under control of the switch 160. The stereophonic signals from the two sidebands, sensed by the sensing units 153 and 154 are delivered through the units 161 and 162, respectively, to the unit 163; and from such unit 163 such combined stereophonic signals for the two sidebands are delivered over the lines 164 and 165, to the coaxial lines for delivery of the superior aesthetic quality rendition. The two microphones 166 and 167 deliver audio other than that which may be sensed from the tape recordings, to the units 156 and 163, respectively. The line 168 extends from the unit 163 to the switchiunit 160, so that the signals delivered to the unit 159 may come either from the unit 156 (monophonic) or from the unit 168 (stereophonic), as selected by the position of such switch-unit.

Under the foregoing disclosed structures it is possible to include commercials into the inferior aesthetic quality rendition, while at the same time excluding such commercials from the superior aesthetic quality rendition. It is also possible to broadcast the stereophonic rendition when desired, as when the program is a conventional and not a prepay or subscription program.

The production of an inferior aesthetic quality rendition of the program may be alternatively effected as follows:

In place of using the single audio track 150 and the sensing unit 152, for delivery of the signals for such inferior aesthetic quality rendition, provision may be made for producing the inferior rendition by use of one of the sideband recordings 151 and its sensing unit 153 or 154 to deliver corresponding audio signals to the unit 156, the single track 150 and its sensing unit 152 remaining unused. Such an arrangement is shown in FIG. 7A, wherein the line 169 from the unit 162 is carried to connection with the unit 156 and the corresponding microphone 166, the connection from the single sensing unit 152 to such unit being eliminated.

The embodiments shown in FIGS. 1 to 7, A1 to 7A, 8 and 9 include the provision of the two sets of antenna lines 23 and 24 from the sending station to the geographical area being served by such lines, with arrangements for switching a subscriber receiver to either of such two sets of lines, or to the antenna which is individual to such receiver. This arrangement is possible by placing the switching unit for each receiver at or close to such receiver, with the control lines for actuating each such switching unit, extending from the control station to such switching unit. In the alternative embodiment shown in FIGS. 10, 11, 12 and 14, I have shown a coaxial line extending from the control station to each subscriber receiver, with the switching unit located in or close to, the control station. This alternative embodiment is as follows:

A control unit 170 is provided at the control station for the subscriber receivers which are to be served by such control station. A switching unit 171 is provided in such control station, corresponding to each of the subscriber receivers served by such control station. An RF line (e.g., coaxial line) 172 is brought from the input element of each subscriber receiver, to the tongue 174 of such switching unit, a spring 175 normally retaining such tongue in engagement with the antenna 176 at the control station. Accordingly, normally the subscriber receiver may tune to any selected conventional program then on the air, without pay or subscriber operation. Such switching unit for each subscriber is provided with the solenoid 177 which when electrified reverses the switch tongue to contact with the element 178. Provision is then made for delivering the subscriber program, either for inferior or superior program translation, to such element 178, according to the desires of the subscriber. Such arrangements are as follows:

The control unit 170 includes three decks, 179, 180 and 181. These decks are provided with vertically registering openings, there being a group of such openings corresponding to each of the served subscriber receivers, so that a plug corresponding to the group of such holes may be inserted to a greater or smaller distance as needed to produce the desired translation of the program. The upper deck 179 receives inferior aesthetic translation signals over the line 182, the middle deck 180 receives superior aesthetic translation signals over the line 183, and the lower deck 181 carries contact elements 184 provided with plug receiving openings constituted to receive a pin carried by the plug, which pin is supplied with DC control current over the line 185 when the plug is inserted, thus delivering DC control current to the line 186 extending to the solenoid 177 of the corresponding switching unit (see FIGS. 11 and 14).

The plug 187 for each subscriber receiver, includes the central pin 188, of which the lower exposed end portion is of size to be entered into the contact element 184 when such plug is inserted and prior to engagement of a second ring contact 189 with either of the decks 179 or 180. Such pin receives control DC from the line 185, and therefore it delivers such DC to the contact element 184 as soon as the plug has been inserted far enough through the openings in the deck, but prior to engagement of the ring contact 189 with the top deck 179. Such ring contact 189 connects by the line 190 with the lower contact 178 of the switch-unit 171. Accordingly, as the plug is inserted into the deck openings, the pin 188 first engages the ring contact 184, thus electrifying the solenoid of the switch-unit for the subscriber receiver corresponding to such deck openings, and reversing the switch-unit, disconnecting its tongue from the contact of the antenna 176, and connecting such tongue with the lower switch-unit contact 178 to receive such RF signals as shall be supplied to the plug's ring contact 189. Such ring contact first engages the top deck 179, and thus receives program signals for translation as the inferior aesthetic quality rendition. By further insertion of the plug its ring contact 189 will be disengaged from the top deck and immediately thereafter it will be engaged with the middle deck 180, for delivery of the superior aesthetic quality signals to the subscriber receiver. It is noted that during such further insertions (to the top deck and then to the middle deck engagement by such ring contact 189,) the pin will remain in engagement with the ring contact 184 of the lower deck, thus retaining the switch-unit tongue in engagement with the contact 178 for delivery of the program signals (either inferior or superior translation, as the case may be), to the subscriber receiver. It is noted that the lower deck is formed of nonconducting material, so that the electrification of each of the ring contacts 184 carried by such deck remains individual to the corresponding switch-unit and corresponding subscriber receiver.

FIG. 10 shows by block diagram a sending station constituted to emit signals in both the inferior aesthetic quality or the superior aesthetic quality translation capability, and to either the control station or to broadcast. This station is as follows:

The color camera 191 delivers its color signals over the line 192, through the unit 193, to the unit 194 in which unit audio signals may be brought into the stream of signals, as will presently appear. The monochrome camera 195 delivers its monochrome signals over the line 196, through the unit 197, to the unit 198, and a branch line 199 from such line 196, delivers the monochrome signals to the unit 200 through the unit 201. Thus the video signals, both color and monochrome, are delivered to a switching area, presently to be described. Although the color and monochrome cameras are shown in FIG. 10 as viewing two distinct images, such showing is made by way of convenience of illustration. A similar explanation has been made respecting the images shown in FIG. 1A.

Audio signals may be produced by several microphones, selectively, as follows:

The microphone 202 delivers audio signals to the unit 194 through the unit 203; The microphone 204 also delivers audio signals to such unit 194 through the unit 205, and the switch 206. The microphones 207 and 208 deliver audio over the lines 209 and 210, through the corresponding units 211 and 212, respectively, to switch contacts, presently to be described.

A main switching unit 213 is provided with the tongues 214, 215, 216, 217 and 218. Conveniently, such tongues are ganged together for simultaneous switching. A further switch element 219 is provided for the operations to be explained. Another switch element 220 is also provided as will be explained. There are provided stationary contacts at each side of each of the tongues 214, 215, 216, 217 and 218, hereinafter referred to as "right-hand" and "left-hand" contacts, respectively, but not numbered to avoid confusion in illustration. The main switching unit 213 is constituted to produce by simple shift to its right-hand or its left-hand position, changes in connections for delivery of either or both the inferior aesthetic quality or the superior aesthetic quality signals to the control station; and for simultaneously delivering to the stream of video signals, audio signals of quality corresponding to the aesthetic quality of such video signals then being delivered.

The following is a statement of operations produced by such main switch 213 when in its right-hand position, and when necessary, accompanied by supplemental switching operations of the simple switches 206, 219 and 220. Such main switching unit then delivers signals as follows: Monochrome video from the unit 198 and the tongue 214, to the top deck 179, with inclusion of audio from the microphone 208, through the unit 212 and the tongue 217. At the same time, delivery of monochrome video from the unit 200, through the tongue 215 and switch 219 (closed), to the television unit 221, is effected for broadcast. Under this operation (main switch in right-hand position) audio may be delivered from the microphone 207, through the unit 211, over the line 209 and the tongue 218, to the unit 200, for inclusion in the broadcast signals. Such right-hand position of the main switch 213 will also cause delivery of color signals as follows: From the unit 194 and tongue 216, to the line 183 leading to the middle deck 180. Such color signals will then include audio from the microphone 202, through the unit 203, to the unit 194. Alternatively or as a supplement to such just defined audio signals, other audio signals may be delivered to the unit 194 for inclusion in the stream of signals delivered to the middle deck 180, by use of the microphone 204, the unit 205, the switch 206 (closed). Study of FIG. 10 will also show that when the main switch 213 is in its right-hand position, color signals cannot be delivered to the unit 221 for broadcast.

Next, the reversing of the main switch 213 to its left-hand position will cause production of the following circuitry:

Color video signals will be delivered from the unit 194, through the switch 220 (closed), and over the line 183 to the middle deck 180. Audio signals may also be delivered from the microphone 202 and the unit 203, to the unit 194, or alternately or simultaneously from the microphone 204 and the unit 205, through the switch 206 (if closed), to such unit 194 for inclusion in the color signals then delivered to such middle deck 180. With the main switch 213 in its left-hand position, monochrome video signals will be delivered from the unit 200 to the tongue 214, and then to the line 182 which extends to the top deck 179. Under this condition (main switch in left-hand position), audio from the microphone 208 will be delivered through the unit 212 to the tongue 218 and thence to the unit 200 for inclusion in the stream of signals delivered to the line 182 which extends to the upper deck 179. It is noted that with the main switch in its left-hand position, monochrome video signals might be delivered by the tongue 215 and the tongue 219 to the line leading to the television unit 221, during the operation wherein color signals were also being delivered to such television unit. To avoid the interference thus produced I have shown the switch 219 which when open, will prevent such simultaneous delivery of color video and monochrome video signals, to the television unit 221.

The provision of pairs of microphones 207 and 208 and 202 and 204, is shown by way of inclusion of alternate audio producing components into the embodiment, one of which alternates may in each case, be reserved for delivery of conventional commercials into the stream of video signals, and the other of which alternates may, in each case, be reserved for delivery of audio announcements or similar audio statements or information, directly related to the program being rendered.

FIG. 13 shows, by block diagram, a conventional color television receiver, which is not included in the subscriber or prepay operations, but which receiver may receive and intelligibly translate the program being broadcast during the time that such program is also being emitted under subscriber or prepay operational conditions. It is not deemed necessary to describe such conventional receiver, since such units are well known and extensively used at the present time.

In FIG. 15 I have shown, schematically, a modified embodiment of sending station constituted to produce the operations previously explained in detail, with respect to the sending station shown in FIG. 10. Such modification resides in the provision of tape recordings for supplying video and the audio signals for the inferior aesthetic quality translation, and for the superior aesthetic quality translation, respectively. Accordingly, the tape 222 is provided, carrying the recordings for the inferior aesthetic quality translation, and the tape 223 is provided, carrying the recordings for the superior aesthetic quality translation. Each of these tapes carries both video and corresponding audio recordings, by cross-scanning, wide-band operations, as disclosed, for example, in Letters Patent of the United States, Pat. No. 3,164,685, FIGS. 3 and 19; 3,614,685, FIGS. 3 and 19; 3,271,514, FIG. 2; and 3,351,718, FIG. 3; and others issued or to be issued. Each of said patents shows dual recording of both video and audio signals wherein both a video component signal and an audio component signal may be concurrently recorded and sensed on such a wide-band cross-scanned tape.

In such FIG. 15 the two tapes are shown at 222 and 223 as being in alignment with each other, but such showing is used as a matter of convenience in placing the figure on the sheet. Actually both tapes would probably be set alongside each other, or a tape of such width as to accommodate both sets of recordings, or such an arrangement as disclosed in each of the above listed patents, would be provided. In any case the tapes should travel at the same speed and in synchronism or approximately synchronism, to effect translations of both of the renditions concurrently. The lateral deflection beam units 224 and 225 are shown for the tape 222, and the lateral deflection beam units 226 and 227 are shown for the tape 223. Sensing plates 228, 229, 230 and 231 are shown proximate to the right-hand edges of the several deflection units, which plates receive the sensed signals and transmit them to further elements. The lateral deflections of the beams of all of the units 224 to 227, are produced and controlled by deflection signals arriving from the unit 232, such signals acting at the yokes of the several deflection units in conventional manner.

The sensing plates 228 and 229 deliver the sensed signals from the units 224 and 225, to the units 233 and 234, respectively, and the sensing plates 230 and 231 deliver the sensed signals from the units 226 and 227, to the units 235 and 236, respectively, such deflectable beam units 224 and 226 being video sensing units, and the deflectable beam units 225 and 227 being audio sensing units. The video and the audio signals from the units 224 and 225 are brought together in the unit 234; and the video and the audio signals from the units 226 and 227 are brought together in the unit 236. Accordingly, the line 237 delivers video and audio signals for translation to produce the superior aesthetic quality translation, and the line 238 delivers video and audio signals for translation to produce the superior aesthetic quality translation. These lines thus correspond to the lines extending from the units 198 and 200 of FIG. 10, and the line extending from the unit 194 of such FIG. 10. Such lines 237 and 238 extend to the unit 239 which simulates the switching gear shown in extensive detail in FIG. 10. From this unit there extend the lines $\mathbf{182^{a}}$ and $\mathbf{183^{a}}$, corresponding to the lines 182 and 183 of FIG. 10; and the unit $\mathbf{221^{a}}$ corresponds to the unit 221 of FIG. 10. It is unnecessary to describe the switching elements contained in such unit 239.

The following comments are pertinent respecting similarities between the embodiments shown in FIGS 1 to 7, and the embodiment shown in FIGS. 10, 11 and 12:

In both such basic embodiments the video (and audio) components for both embodiments are transmitted between the sending station and each subscriber's receiver, by nonaccessible transmission, specifically, by coaxial lines. In each embodiment there is provided a switching unit individual to the subscriber's receiver to select the reception of the program aesthetic quality—in the case of FIGS. 1 to 7, selection as between an inferior aesthetic quality translation and a superior aesthetic quality translation, or broadcast conventional reception as desired; in the case of FIGS. 10, 11 and 12, selection as between the locally determined (at the control station) form of the quality by the switch 174 (either broadcast or special program), with a further selection at such control station, as between the inferior aesthetic quality or the superior aesthetic quality (by the plug-in switching unit).

In the embodiment of FIGS. 1 to 7, a single pair of lines (two conductors to each line), may serve a relatively large area containing a substantial number of subscribers, by bringing such single pair of coaxial lines (one for inferior and the other for superior aesthetic translation) to a central point of such area; with branches extended out from such main pair to central portions of subareas, each such branch serving a substantial number of subscribers; and with individual pairs of lines extended to each subscriber or possibly two or three subscribers close together. With this arrangement of FIGS. 1 to 7, it is, however necessary to extend a pair of control lines to each subscriber, or possibly by the use of control currents of numerous frequencies carried by each pair of control lines, each frequency tuned to a resonantly responsive element of the switching unit of the corresponding receiver; whereas such control lines are not required in the arrangement of FIGS. 10, 11 and 15.

On the contrary, the embodiment of FIGS. 10, 11 and 15 requires the provision of a pair of coaxial lines from the control station to each subscriber's receiver. It is thus evident that the selection as between the embodiments of FIGS. 1 to 7, and of FIGS. 10, 11 and 15 should depend on local conditions including the proximity of the installation, taking account also of the fact that it is not necessary, in the case of the embodiment of FIGS. 1 to 7, that the coaxial lines run through the control station, or even near to such control station.

It is noted that since there are shown two nonaccessible transmission lines from the sending station to each pay or television receiver, one for the inferior aesthetic quality signals, and the other for the superior aesthetic quality signals, it is possible for such pay or subscription receiver to receive the inferior aesthetic quality rendition of the program either through the nonaccessible conductor transmission line, or over-the-air, broadcast by use of the receiver antenna. It is noted that provision has been made in each of the embodiments shown in the drawings, for injection of the audio component of the program by use of different microphones for two of the aesthetic qualities of rendition, and translation. Accordingly, since the signals for the inferior aesthetic quality are broadcast (as well as being sent by nonaccessible line), it is possible, by provision of two microphones for the inferior aesthetic quality signals, to include commercials, in one of such inferior signal emittions, but not in the other inferior signal emittion. I have made such provision in several of the embodiments shown in the drawings. Thus, the commercials may be included in the broadcast inferior quality signals, but eliminated from the inferior quality signals delivered by the nonaccessible line which carries the inferior aesthetic quality signals to the pay or subscription receivers. Thus also, the operator of the pay or subscription receiver may receive the inferior aesthetic quality rendition with commercials, by broadcast (antenna reception), or without the commercials (nonaccessible carrier line.)

In FIG. 16 I have shown by block diagram, another embodiment of circuitry of the control line extending from the control station to a subscriber-receiver. In this case one end of the two polar relay solenoids $46^a$–$48^a$–$47^a$ is grounded. The other end of such pair of solenoids is connected to the single control line 240 extending from the control station to such subscriber-receiver switching unit. Provision is then made for applying to such control line at the control station, a DC potential either above ground potential or below ground potential, thus producing current flow through the polar relay solenoids in the one direction or the other. Such illustrated means to apply either an above ground potential or a below ground potential to the line 240 is as follows:

I have shown the battery 245 having its central portion grounded. Accordingly, the potential of the grounded end of the pair of solenoids of the polar relay is held at the potential of the central portion of the battery. Then, by connecting the free end of the line 240 to one end or the other of the battery, the direction of current flow through the pair of relay coils may be selected.

A convenient arrangement for effecting such connection of the free end of the control line 240 to one end or the other of the battery is as follows:

A two-deck socket unit is provided, having the two decks 243 and 244. For each subscriber-receiver there is provided a pair of aligned holes in such two decks. The free end of the control line from each subscriber-receiver is provided with a plug 242 having the single ring contact 241 to which the control line 240 is connected. Accordingly, by inserting the plug into the deck unit only far enough to engage the ring contact with the top deck, current flow through the receiver switching unit will be in one direction; by inserting the plug into the deck openings the full intended amount, connection will be established with the lower deck, producing current flow through the polar relay solenoids in reverse direction.

The sending station 20 may be a CATV station, with provision for originating video signals of a program, as well as receiving signals from a distant broadcast source, broadcast from another sending station for a program, with delivery of such originated signals locally by broadcasting, as well as delivery of the distantly originated signals, by nonaccessible signal carrier such as coaxial line, to the subscribers of such CATV station, to selected subscribers of such CATV station; with provision for each such subscriber to select either the locally broadcast signals or the distantly generated signals at his option.

Those blocks legended 'transfer' in the drawings are junction blocks, and may include more than simple connections between the connected lines, but they include interconnections between the conductors connected to such blocks, for transfer of signals between such connected lines, according to the operations and statements contained in the specification of this case.

I claim:

1. A system for the emission, transmission, and translation of a television program, said system comprising in combination a sending station including first means to produce and emit first signals which when received are translatable for production of a program of intelligence in an inferior aesthetic quality, and also including second means to produce and emit second signals which when received are translatable for production of a program of intelligence in a superior aesthetic quality; a first plurality of receivers constituted to receive and translate said first signals to produce the television program in said first inferior aesthetic quality as an intelligible program; a second plurality of pay or subscription receivers constituted to receive and translate either said first or said second signals to produce the television program in either the first aesthetic quality translation or in said second aesthetic quality translation, selectively, as an intelligible program; first means to broadcast said first emitted signals; a nonaccessible conductor transmission line in connection with each the first and second means which emits the first and second signals, said conductor transmission lines extending to locations proximate to the second receivers; receiver antenna means; a received signals input element in connection with each of the second receivers; a switching element corresponding to each of the second receivers; each such switching element including means and connections constituted to produce connection of either of the nonaccessible conductor transmission lines to the received-signal input element of the corresponding receiver, selectively; together with manual control means constituted to cause the switching element of each receiver to connect either the first or the second nonaccessible transmission line to the received-signals input element of such receiver, selectively.

2. A structure as defined in claim 1; wherein said switching element of each second receiver is constituted, when in one switching position, to select and connect only the receiver-antenna means to the received-signals input element of such receiver.

3. A structure as defined in claim 1; wherein the switching element of each second receiver is constituted, when in a second position, to connect only a selected nonaccessible transmission line to the received-signals input element of such receiver.

4. A structure as defined in claim 1; wherein the inferior aesthetic quality translation of the first signals, is a monochrome picture translation, and the superior aesthetic quality translation of the second signals, is a color picture translation.

5. A structure as defined in claim 1; wherein the inferior aesthetic quality translation of the first signals, is a negative picture translation, and the superior aesthetic quality translation of the second signals, is a positive picture translation.

6. A structure as defined in claim 1; wherein the inferior aesthetic quality translation of the first signals is a color picture translation in wrong colors, and the superior aesthetic quality translation of the second signals is a correct color picture translation.

7. A structure as defined in claim 1; wherein the inferior aesthetic quality translation of the first signals is a two dimensional picture translation, and the superior aesthetic quality translation of the second signals, is a three dimensional picture translation.

8. A structure as defined in claim 1; wherein the first signals comprise only video signals and the inferior aesthetic quality translation of such signals comprises only a picture translation, and the second signals comprise both video and audio signals and the superior aesthetic quality translation of such signals comprises a picture translation and an audio translation of the program.

9. A structure as defined in claim 1; wherein the manual control means of the switching element comprises a remote control connection to such switching element.

10. A structure as defined in claim 1; wherein the manual control means of the switching element comprises operator control means proximate to the switching element. emission, 11. A system for the emission, transmissión, and translation of a television program, said system comprising in combination a sending station including first means to produce and emit first signals which when received are translatable for production of a program of intelligence in an inferior aesthetic quality, and also including second means to produce and emit second signals which when received are translatable for production of a program of intelligence in a superior aesthetic quality; a first plurality of receivers constituted to receive and translate said first signals to produce the television program in said first inferior aesthetic quality as an intelligible program; a second plurality of pay or subscription receivers constituted to receive and translate either said first signals to produce the television program in the first aesthetic quality translation, or in the second aesthetic quality translation, selectively, as an intelligible translation; first means to broadcast the first emitted signals; a nonaccessible conductor transmission means in connection with each the first, and second emitted signals from the sending station to each of the second receivers; receiver antenna means; and a switching element corresponding to each of the second receivers, constituted to connect the signals-received input element of such receiver to the receiver antenna means, or to either the first signals nonaccessible conductor transmission means, or to the second signals nonaccessible conductor transmission means, selectively, under manual control.

12. A structure as defined in claim 11; wherein the switching element is located in proximity to each of the corresponding second receivers.

13. A structure as defined in claim 11; wherein the switching element is located in control station.

14. A system for the emission, transmission, and translation of a television program, said system comprising in combination a sending station including first means to produce and emit first signals which when received are translatable for production of a video program of intelligence in a first inferior aesthetic quality, and also including second means to produce an emit second signals which when received are translatable for production of the same video program of intelligence in a superior aesthetic quality; a plurality of pay or subscription receivers constituted to receive and translate said first signals or said second signals selectively, for production of the television program in either the first aesthetic quality translation, or in the second aesthetic quality translation, selectively, as an intelligible translation each receiver having a signal receiving RF input element; a nonaccessible conductor transmission line in connection with one of the first signals emission producing means of the sending station, and another nonaccessible conductor transmission line in connection with the second signals emission producing means of the sending station, both such nonaccessible conductor transmission lines extending to locations in proximity to each of the receivers; a control switching element corresponding to each of the receivers, and connections and said control switching element constituted to connect the signals-received input element of the corresponding receiver, to either of the nonaccessible conductor lines, selectively, under control of an operator.